US012734867B1

(12) United States Patent
Baier

(10) Patent No.: US 12,734,867 B1
(45) Date of Patent: Sep. 15, 2026

(54) HARDTOP REMOVAL BRACKET AND METHOD OF CONNECTING THE BRACKET TO AN AUTOMOTIVE HARDTOP

(71) Applicant: Eric Andrew Baier, Oshkosh, WI (US)

(72) Inventor: Eric Andrew Baier, Oshkosh, WI (US)

( * ) Notice: Subject to any disclaimer, the term of this patent is extended or adjusted under 35 U.S.C. 154(b) by 280 days.

(21) Appl. No.: 18/680,260

(22) Filed: May 31, 2024

Related U.S. Application Data

(60) Provisional application No. 63/470,212, filed on Jun. 1, 2023.

(51) Int. Cl.
*B60J 7/16* (2006.01)
*B60J 1/18* (2006.01)
*B60J 7/10* (2006.01)

(52) U.S. Cl.
CPC ............ *B60J 7/165* (2013.01); *B60J 1/1823* (2013.01); *B60J 7/106* (2013.01)

(58) Field of Classification Search
CPC ....... B62D 65/06; B60J 1/1823; B60J 7/1642; B60J 7/11; B60J 7/108; B60J 7/16; B60J 7/1614; B60J 7/1628; B60J 7/1635; B60J 7/165; B60J 7/106; B60J 7/1664; B60J 5/10; B60J 5/101; B60J 5/103; B60J 5/107; E05Y 2900/546
USPC ................................ 296/102, 103, 106, 218
See application file for complete search history.

(56) References Cited

U.S. PATENT DOCUMENTS 693,127 A 2/1902 Gardner et al.
2,477,575 A 8/1949 Bubser, Jr.
3,760,625 A 9/1973 Archambault
4,257,570 A 3/1981 Rasmussen
5,024,409 A 6/1991 Bohnen
6,109,819 A 8/2000 Welch
6,220,562 B1 4/2001 Konkle
6,957,918 B2 * 10/2005 Beutler ................ B60B 35/163 384/519
10,246,307 B1 * 4/2019 Baier ........................ B66C 1/62
10,934,136 B1 * 3/2021 Baier ........................ B66C 1/62

(Continued)

FOREIGN PATENT DOCUMENTS

CA 2312680 6/2000

OTHER PUBLICATIONS

Bed Claw, BedClaw Multi-Purpose Furniture Attachment Brackets, Set of 4, as viewed at https://www.walmart.com/ip/BedClaw-Mulit-Purpose-Furniture-Attachment-Brackets-Set-4-These-BedClaw-brackets-feature-three-keyhole-slowts-either . . . on Feb. 15, 2022. 6 pages.

(Continued)

*Primary Examiner* — Gregory A Blankenship
(74) *Attorney, Agent, or Firm* — Brannen Law Office, LLC

(57) ABSTRACT

A hardtop removal bracket and method of connecting the bracket to an automotive hardtop is provided. The brackets are useful to create an attachment point to assist in the removal of the hardtop. The bracket has an upper piece and a lower piece. The upper piece has a passage through it. The lower piece has a passage through it having an upper portion and a lower portion. The lower portion is centrally aligned with the upper portion. The lower portion has a width between sides. The brackets interface with the hardtop rear window hinges. Each hinge has a pivoting piece connected to a window and a stationary piece connected to the hardtop shell. The bracket fits between the sidewalls of the stationary piece and is between the stationary piece and pivoting piece. A bracket can be used with each hinge creating two lift points.

20 Claims, 14 Drawing Sheets

(56) References Cited

U.S. PATENT DOCUMENTS

| | | | | |
|---|---|---|---|---|
| 11,204,050 | B2 | 12/2021 | Kennedy et al. | |
| 11,643,304 | B1 * | 5/2023 | Baier | B66C 1/62 294/81.5 |
| 11,679,963 | B1 * | 6/2023 | Moutz, Jr. | B66C 1/12 212/299 |
| 2009/0309079 | A1 * | 12/2009 | Lacina | B60J 7/106 254/47 |
| 2018/0290701 | A1 * | 10/2018 | Stirling | B62D 65/026 |
| 2019/0291552 | A1 * | 9/2019 | Lovasz | B60J 7/1851 |
| 2022/0000296 | A1 | 1/2022 | Moss et al. | |
| 2022/0194184 | A1 * | 6/2022 | Mather | B60J 1/1823 |
| 2024/0375495 | A1 * | 11/2024 | Gemayel | B60J 7/11 |
| 2024/0417004 | A1 * | 12/2024 | Ruttangusakul | B60J 7/106 |
| 2025/0115106 | A1 * | 4/2025 | Moore | B60J 7/1607 |
| 2025/0187413 | A1 * | 6/2025 | Hunt | B62D 29/008 |
| 2025/0289691 | A1 * | 9/2025 | Hamilton | B66C 23/42 |
| 2026/0042646 | A1 * | 2/2026 | Cullinan | B25H 1/0007 |

OTHER PUBLICATIONS

CRL ALUM-CD395-VCP-1 Aluminum 135 Degree Fixed Corner for the Deluxe Header Kit, as viewed at https://www.dkhardware.com/aluminum-135-degree-fixed-corner-for-the-deluxe-hedter-kit-alum-cd395-vcp=1=product=112886.html?utm_source=googl . . . on Feb. 15, 2022. 3 pages.

Guden, Custom Hinge Selection Tool, as viewed at https://www.guden.com/customize/Slip-Joint-Hinges/Holes/Squares,-Stars-and=More on Feb. 15, 2022. 2 pages.

DSI Underground, Eyebolts, Scaling Bars & Utility Hangers as viewed at https://dsiunderground.ca/products/mining/eyebolts-scaling-bars-utility-hangers/keyhole-brackets on Feb. 16, 2022. 3 pages.

888 Manufacturing Corportation, Key Hole Hanger With Raised Center as viewed at https://888mfgcorp.com/keyholehangerraisedcenter100pack8909-c.aspx on Feb. 16, 2022. 6 pages.

Zips, Miller Keyhole Plate w/ Bolt Holes as viewed at https://zips.com/parts-detail/miller-keyole-plate-w-bolt-holes-12-0707239?ppc_keyword-&gciid-EAlaIQobChMlnMWg7P6C99IVXRmtBh3rigCTEAkY . . . on Feb. 15, 2022. 1 page.

Vivo, Universal Steel Dual Wall Mount I Brackets Designed For Soundbar Speakers as viewed at https://wayfair.com/furniture/pdp/vivo-universal-steel-dual-wall-mount-I-brackets-designed-for-soundbar-speakers-uczf1472.html on Feb. 15, 2022. 16 pages.

* cited by examiner 151
175
170

176
156
150
185
190
154
195
180
153
152
151
170
155
180
156
150

152

50

185
190
195
180
120
150
170
50
110
185
190
120
195
180
150

HARDTOP REMOVAL BRACKET AND METHOD OF CONNECTING THE BRACKET TO AN AUTOMOTIVE HARDTOP

This United States utility patent application claims priority on and the benefit of provisional application 63/470,212 filed Jun. 1, 2023, the entire contents of which being hereby incorporated herein by reference.

BACKGROUND OF THE INVENTION

1. Field of the Invention

The present invention relates to a hardtop removal bracket and method of connecting the bracket to an automotive hardtop, and in particular to a bracket for use with a rear window hinge to facilitate hardtop removal and the method of installation thereof.

2. Description of the Related Art

Many vehicles make use of removable hardtops. One such vehicle is made by Ford and sold as a Bronco model. While this particular type of vehicle is described as an example, there are many other vehicles that have removable hardtops.

Removable hardtops are desirable to some purchasers as their removal allows for the driver and occupants to feel closer to the outdoors. While such a result can be desirable, it can be difficult to remove the hardtop, particularly if one person is attempting the task without the assistance of a second person.

Thus, there is a need for a hardtop removal bracket and method of attaching the bracket to an automotive hardtop that solves these and other problems.

SUMMARY OF THE INVENTION

A hardtop removal bracket and method of connecting the bracket to an automotive hardtop is provided. The brackets are useful to create an attachment point to assist in the removal of the hardtop. The bracket has an upper piece and a lower piece. The upper piece has a passage through it. The lower piece has a passage through it having an upper portion and a lower portion. The lower portion is centrally aligned with the upper portion. The lower portion has a width between sides. The brackets interface with the hardtop rear window hinges. Each hinge has a pivoting piece connected to a window and a stationary piece connected to the hardtop shell. The bracket fits between the sidewalls of the stationary piece and is between the stationary piece and pivoting piece. A bracket can be used with each hinge creating two lift points.

There are many aspects of the present invention, which each can have unique and independent advantages, as set out in particular in the appended claims.

According to one advantage of the present invention, two brackets can be used with the existing hinges to create removal points. In this regard, the brackets can be used to facilitate removal and storage of the vehicle hardtop via a lifting mechanism such as a harness, rope or hoist. It is understood that a front harness can be used with the front of the hardtop.

According to another advantage of the present invention, each bracket can be connected to the hinge by loosening (at least partially) a fastener and connecting the bracket to the hinge. This is done without making any permanent alterations to the vehicle or causing any damage to the vehicle.

According to a further advantage of the present invention, the bracket fits within existing hinge assembly without interfering with hinge operation or sealing.

According to a still further advantage of the present invention, the bracket can have a width smaller than the external width of the hinge pivoting piece, which allows the bracket to be inserted without disassembling the hinge.

According to a still further advantage yet of the present invention, each bracket is securely fastened to the hinge. With the hinge in the lowered position (glass shut), the connection point is concealed deterring unfastening and theft.

According to a still further advantage yet of the present invention, the bracket has a lower piece opening that serves two purposes, namely allowing the fastener head to pass through so that the fastener shaft can be engaged by the lower piece passage lower portion, and to allow for clearance of the hinge protrusion within the lower piece passage upper portion.

According to a still further advantage yet of the present invention, lifting forces resulting from lifting of the hardtop reinforce the position of the fastener shaft within the lower piece passage lower portion.

According to a still further advantage yet of the present invention, lifting forces are centrally applied to the bracket (within lower portion or slot). When two brackets are used (in conjunction with a harness or bracket used with the front of the hardtop), twisting of the hardtop during removal and storage is prevented.

According to a still further advantage yet of the present invention, the upper piece of the bracket is angled. This allows the bracket to clear existing structure of the hardtop and remain out of the way of the hinge during operation of the hinge. This also allows for offset access to the upper piece passage so that a hook or other structure used with a rope or harness can be secured to the passage without contacting the hardtop.

According to a still further advantage yet of the present invention, the corresponding methods of connecting the bracket to the hardtop by integrating the brackets with the rear hinges allow the user to easily remove and store the hardtop with a lifting mechanism such as a harness system, without the need for additional people to assist. Related, the bracket and method of installing the bracket advantageously clears a hinge protrusion.

According to a still further advantage yet of the present invention, the bracket is unobtrusive when installed and can remain installed indefinitely.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
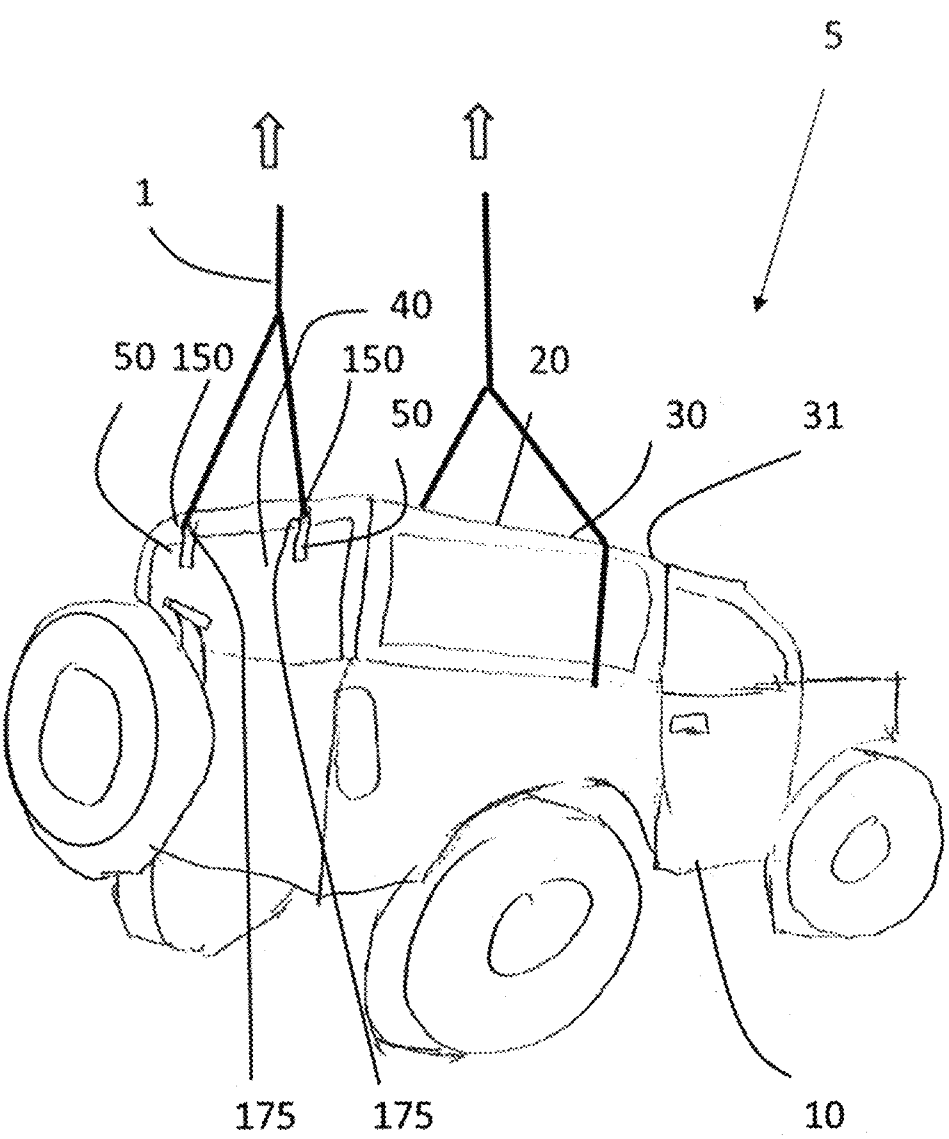
FIG. 1 is a perspective view of an automobile.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

One type of vehicle 5 has a body 10 and a hardtop 20 that is removable from the body 10. The hardtop 20 typically has a shell 30 with a front 31 and a rear 32. A window 40 is pivotally connected to the shell 30 at the rear 32 of the shell 30. Two hinges 50 are normally used to make the pivotal connection of the window 40 and shell 30. Each hinge 50 is secured to the shell 30 with a fastener 120 having a head 125 and a shaft 126. The shaft is a threaded shaft, wherein turning the head causes the shaft to selectably translate into or out of the shell receiving hole. A protrusion 110 is above each hinge 50.

Each hinge 50 has a pivoting piece 60 and a stationary piece 80. The pivoting piece 60 has a first sidewall 65, a second sidewall 70 and a bottom plate 75. The bottom plate 75 has a fastener access hole 76 therethrough. A removable cover can be provided to cover the pivoting piece. The stationary piece 80 has a first sidewall 85, a second sidewall 90 and a bottom plate 95. The bottom plate 95 has a mounting hole 96 therethrough. A pivot bar 100 is provided to pivotally connect the pivoting piece 60 and stationary piece 80.

Figure 2:
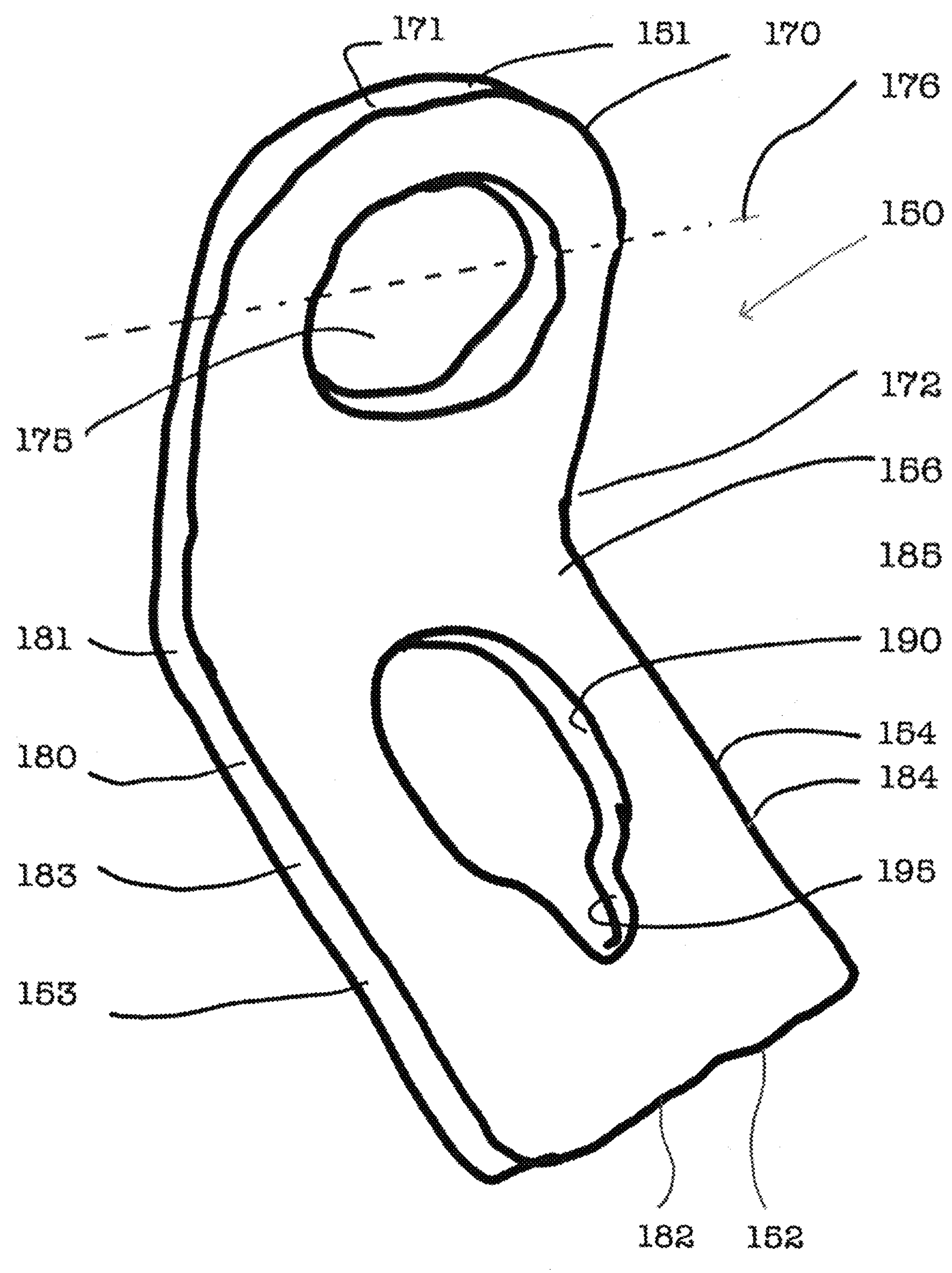
FIG. 2 is a perspective view of a bracket of the present invention.
Figures 3, 4:
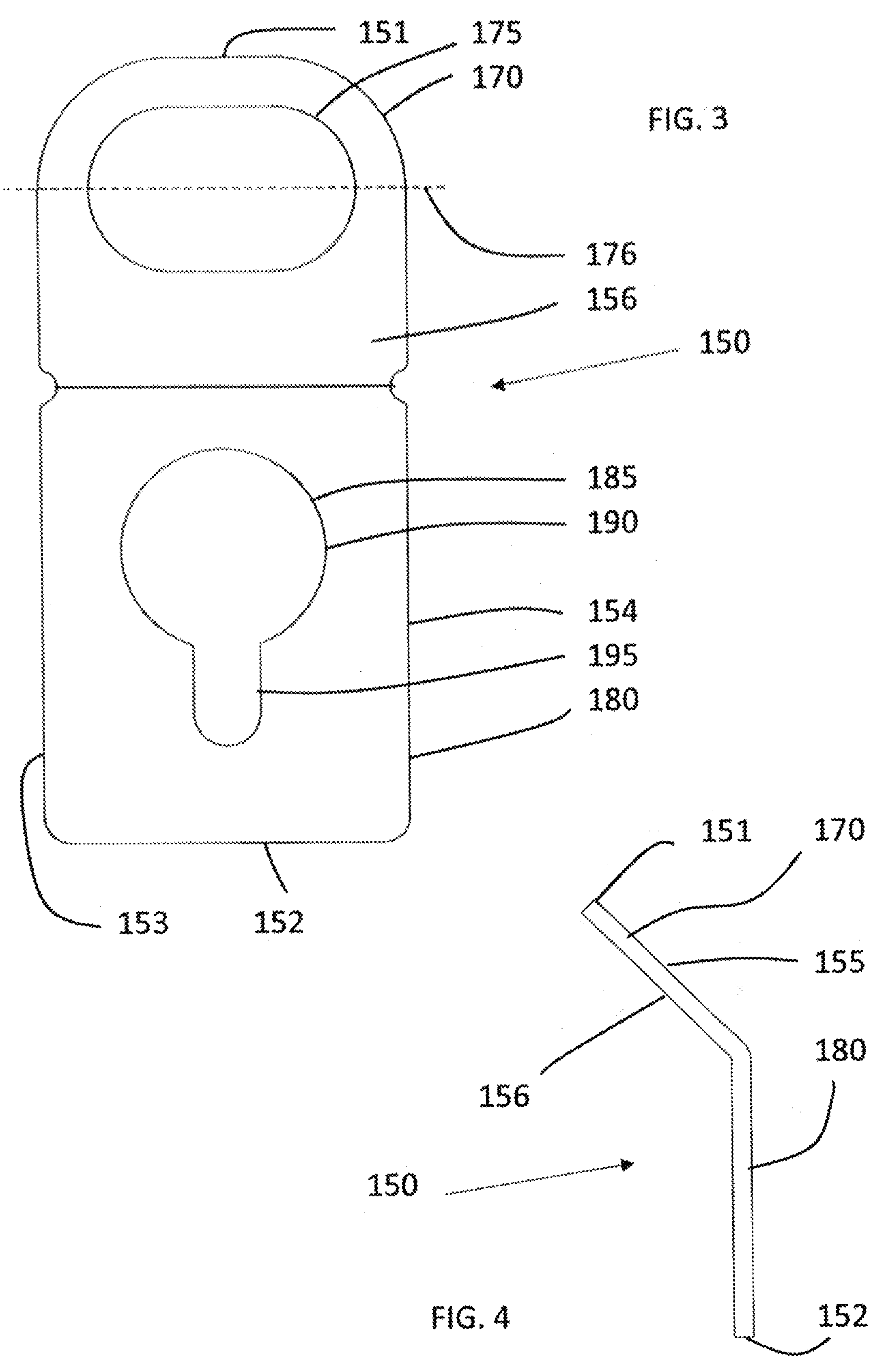
FIG. 3 is a rear view of the bracket illustrated in FIG. 2.
FIG. 4 is a side view of the bracket illustrated in FIG. 2.
Figure 5:
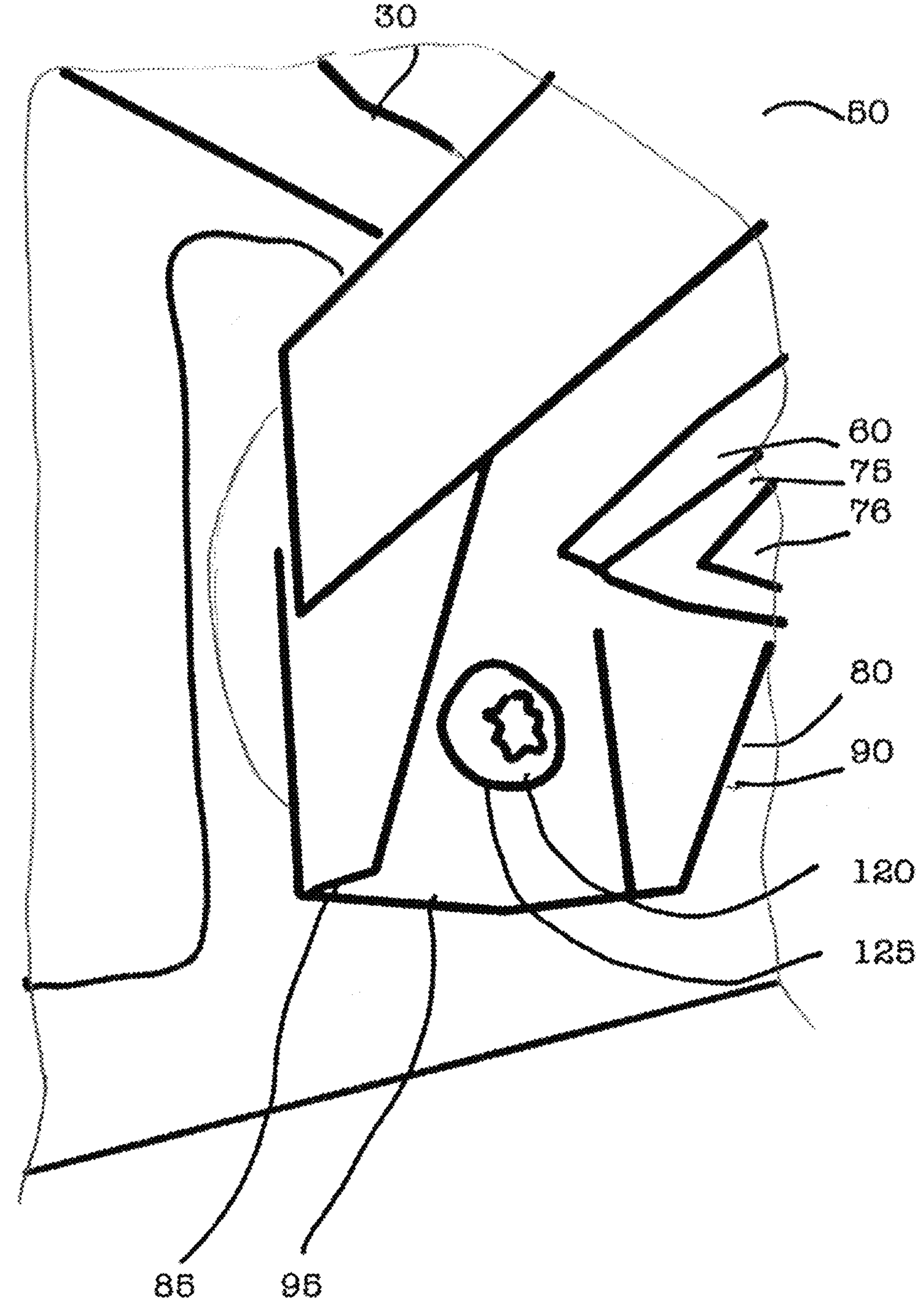
FIG. 5 is a perspective view showing an existing hinge of a hardtop for the rear window.
Figures 6, 7:
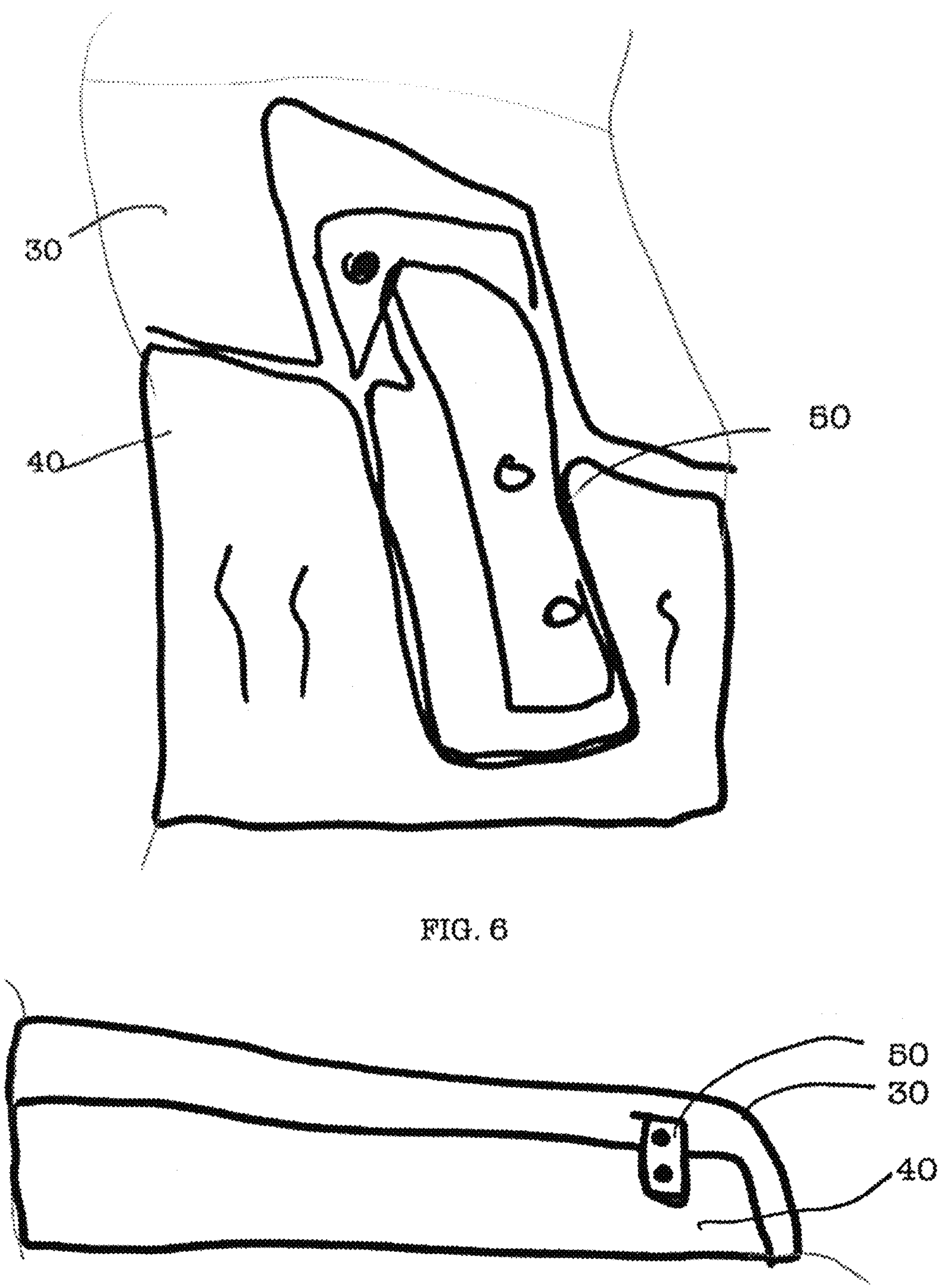
FIG. 6 is a perspective view showing a cover being removed from the hinge.
FIG. 7 is a rear view showing the window in the down position with the cover removed.
Figures 8, 9:
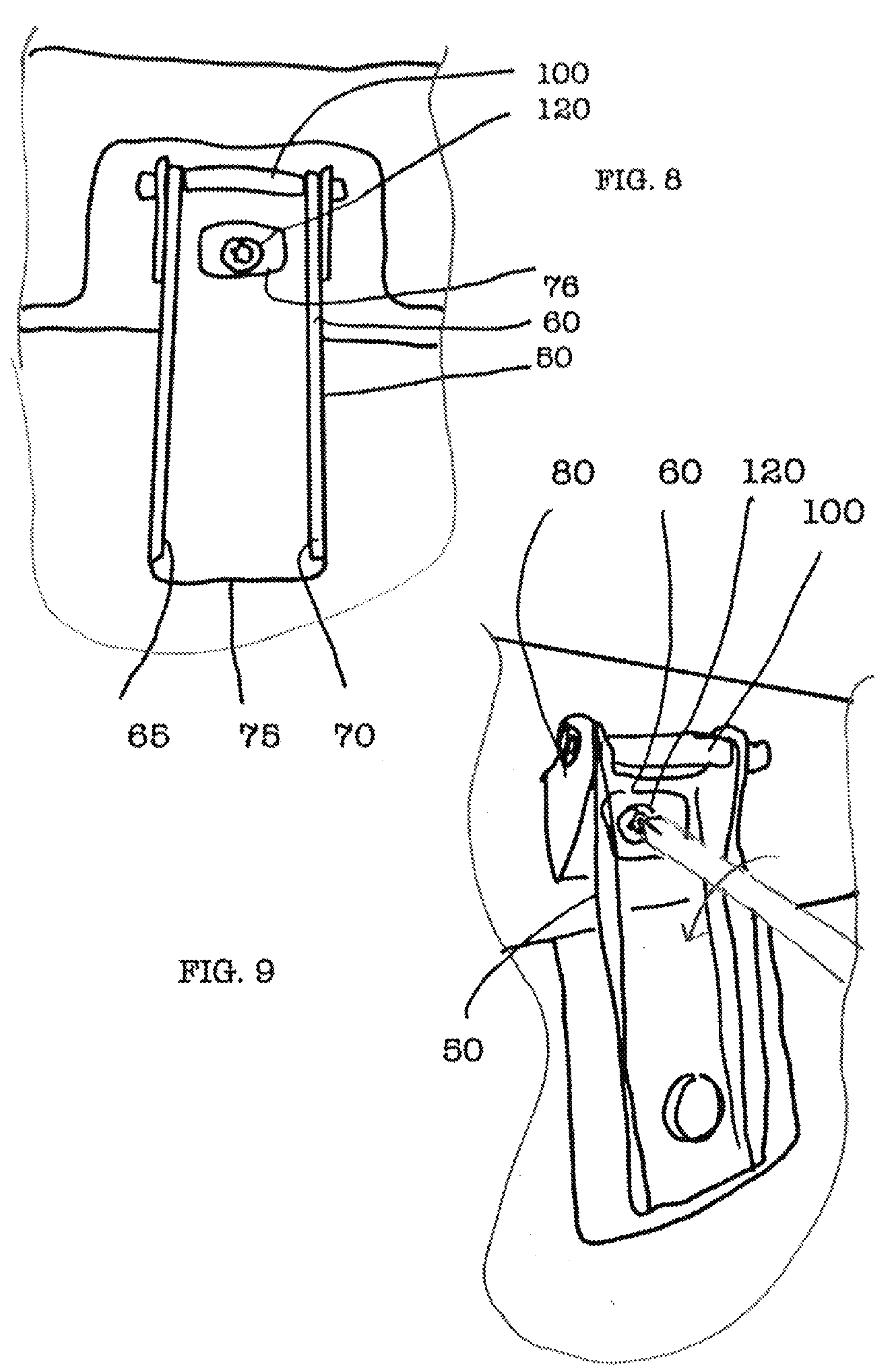
FIG. 8 is close-up view showing the hinge with the cover removed.
FIG. 9 is a perspective view showing a hinge fastener being loosened.
Figure 10:
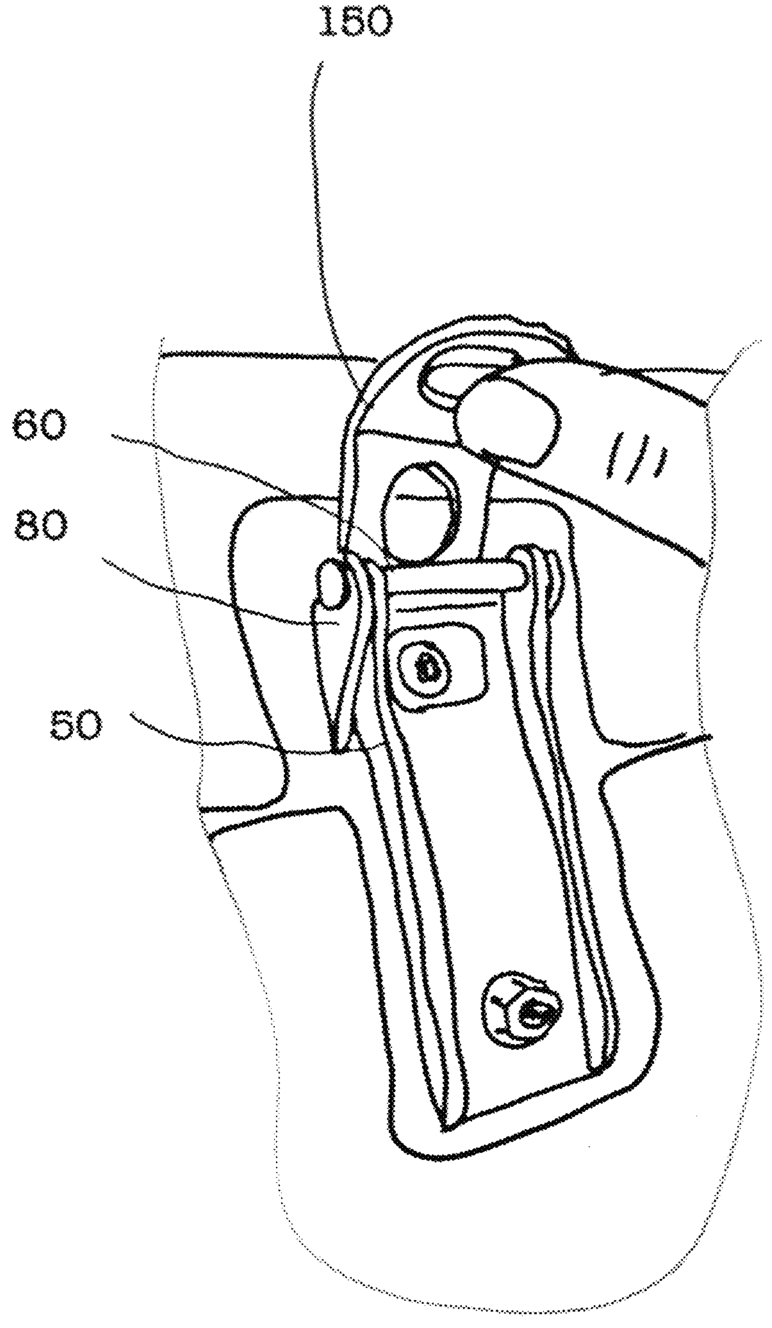
FIG. 10 is a view showing the bracket being vertically lowered into the hinge.
Figures 11, 12:
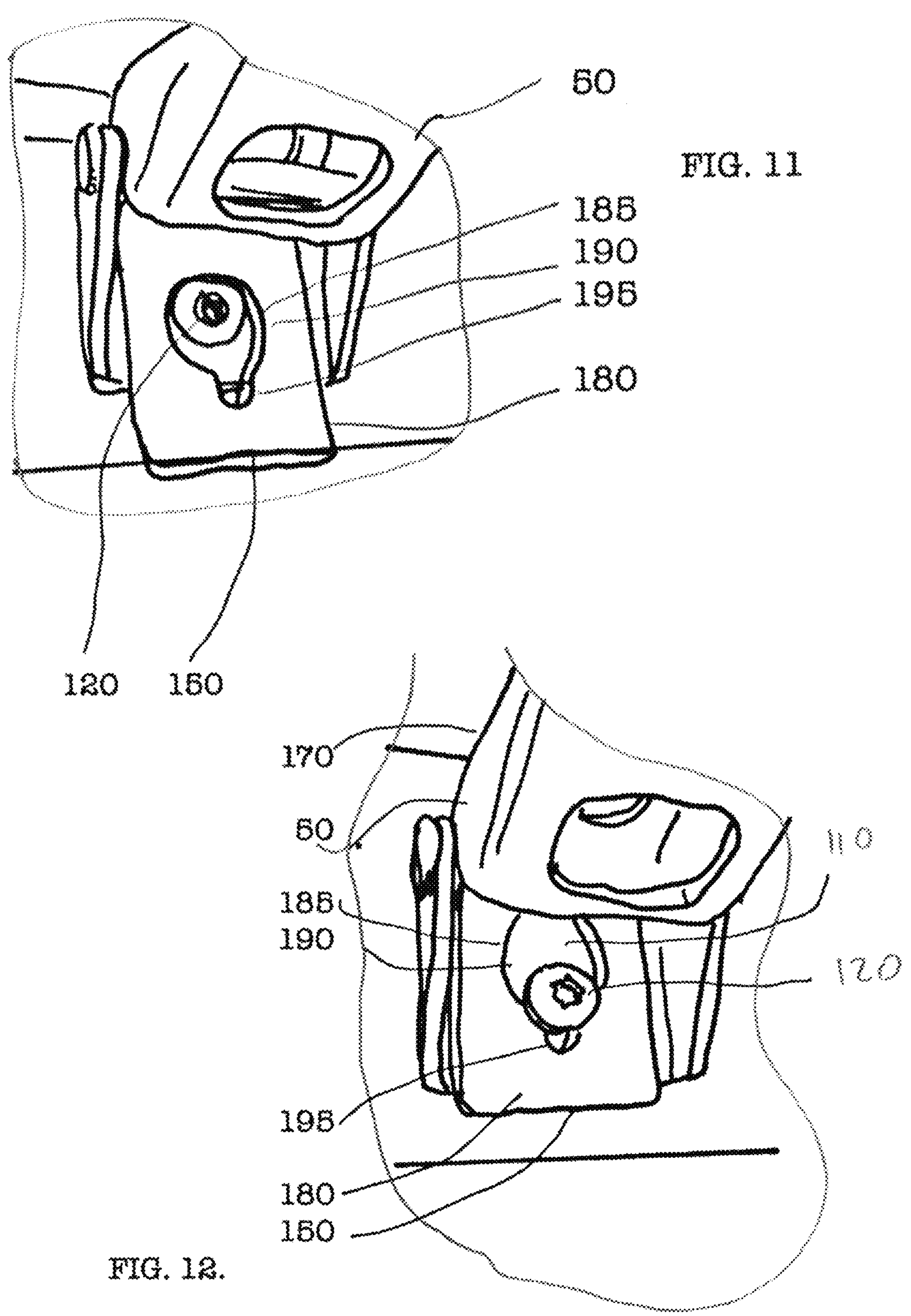
FIG. 11 is a view showing the fastener head passing through an upper portion of a lower piece passage.
FIG. 12 is a view showing the bracket being raised so that the fastener shaft engages the lower portion of the lower piece passage.
Figure 13:
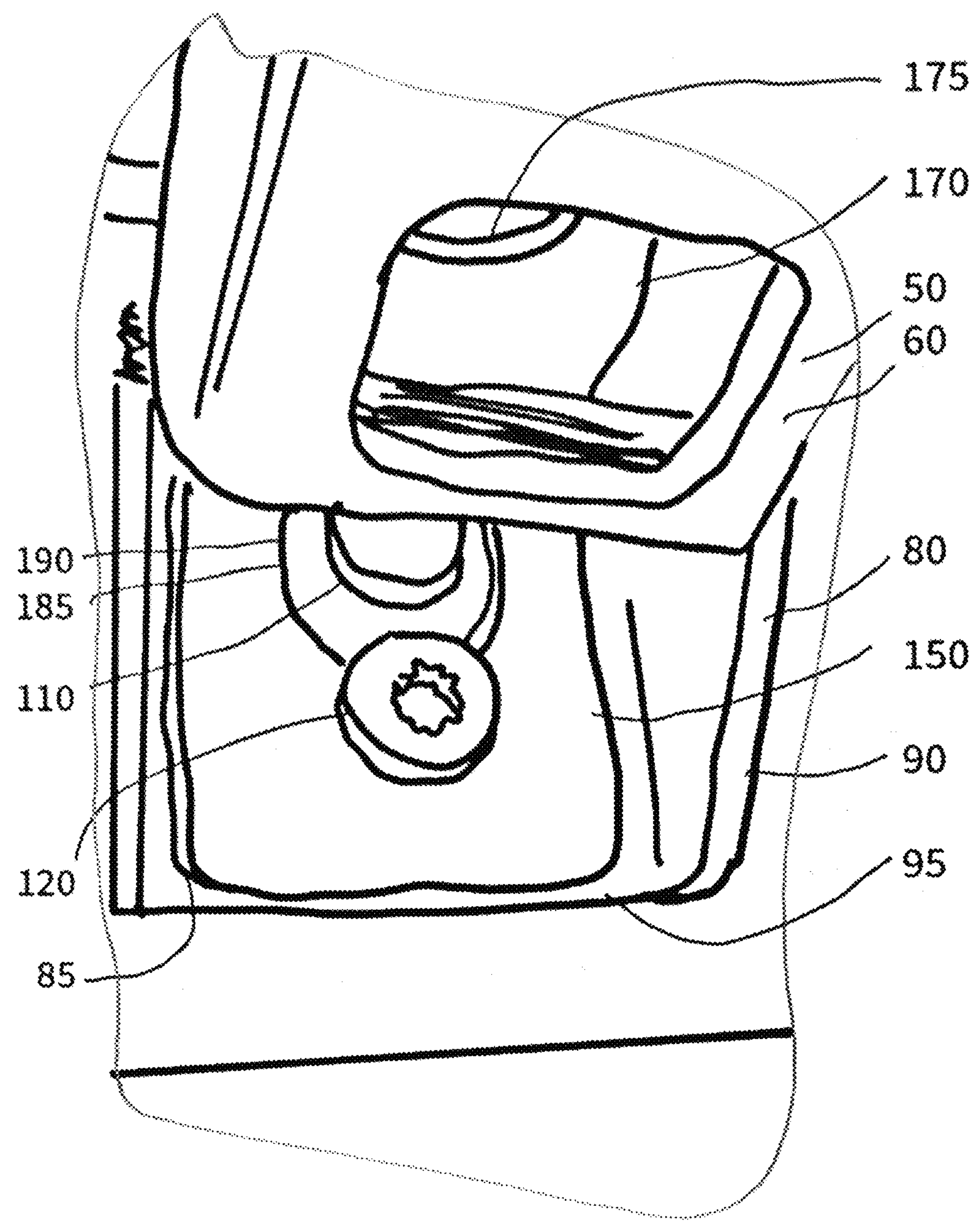
FIG. 13 is a view showing the bracket fully raised and the fastener shaft fully received within the lower portion of the lower piece passage.
Figure 14:
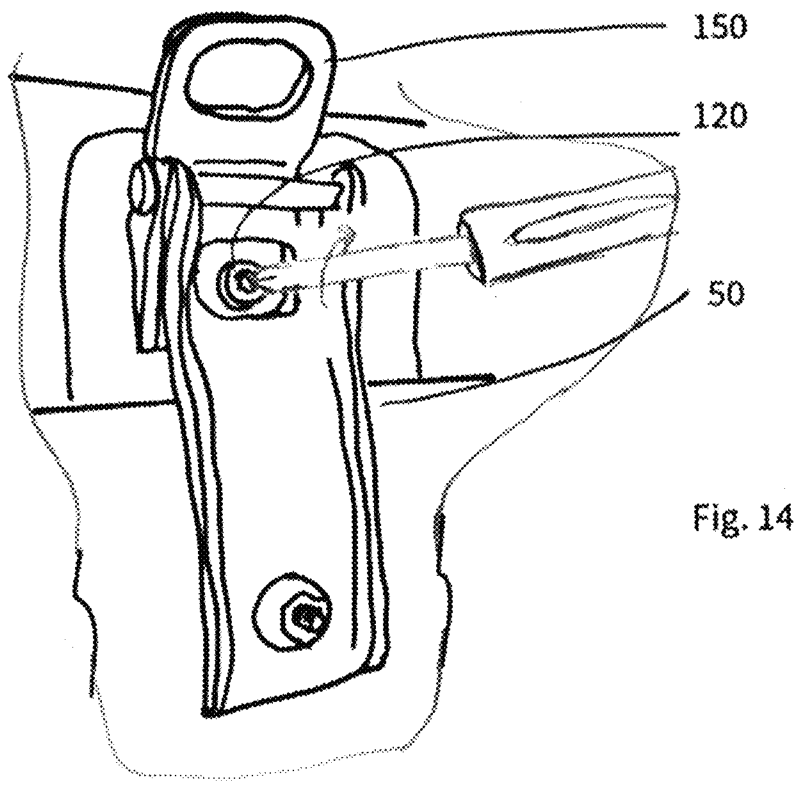
FIG. 14 is a view showing the fastener being tightened.
Figure 15:
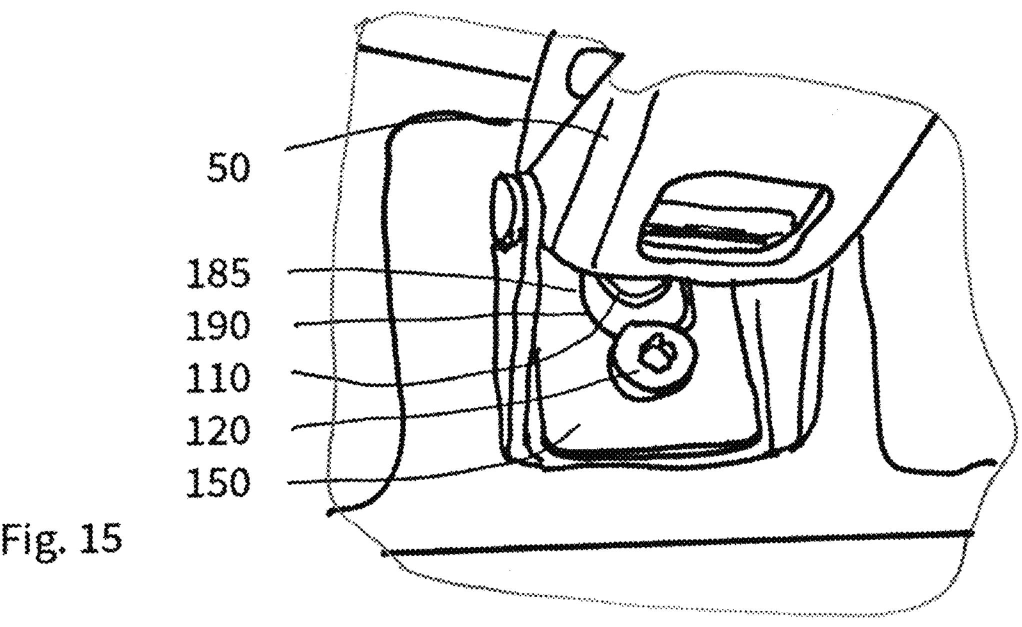
FIG. 15 is a view showing the bracket mounted to the hinge.
Figure 16:
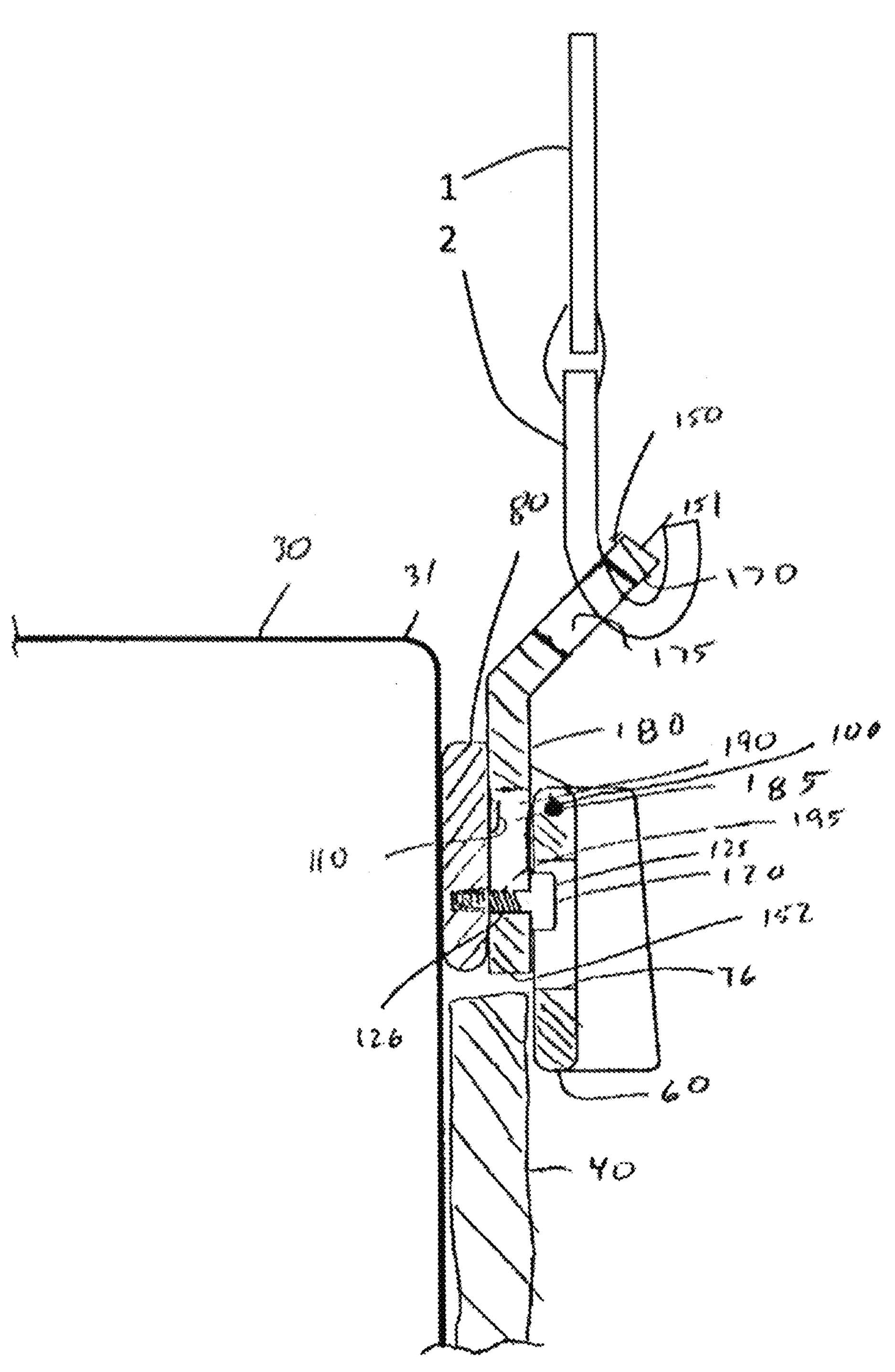
FIG. 16 is a cross-sectional view showing the bracket being mounted to the hinge.
Figure 17:
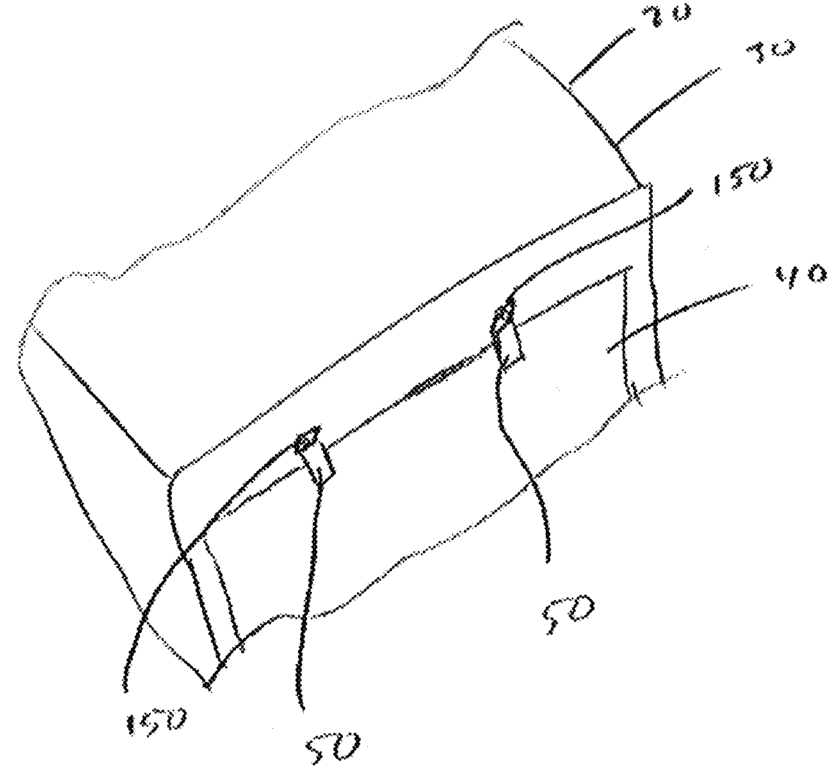
FIG. 17 is a rear view of an automobile showing two backets in mounted positions.

A bracket 150 is shown in isolation in FIGS. 2-4. The bracket 150, when installed, creates a lift point for the rear 32 of the shell 30 of the hardtop 20. The bracket 50 has a top end 151, a bottom end 152, sides 153 and 154, respectively, a front 155 and a rear 156. The bracket 150 has an upper piece 170 and lower piece 180. The top piece 170 lies in a top piece plane and the bottom piece lies in a lower piece plane. The upper piece is angularly offset from the lower piece. The angular offset is preferably about 125 degrees, measured from a rear face of the lower piece and a downward angled face of the upper piece. This allows the passage 175 to be offset from the lower piece plane.

The upper piece 170 has a top 171 and a bottom 172. The upper piece 170 has a passage 175 therethrough. The upper piece passage is preferably a wide slot having a longitudinal axis 176.

The lower piece 180 has a top 181 and a bottom 182. The upper piece 180 has a passage 185 therethrough. The lower piece passage 185 has an upper portion 190 and a lower portion 195. The lower portion 195 is centrally aligned with the upper portion 190. The lower portion 195 is preferably a vertical slot, with the top of the slot being open to the upper portion 190.

Figure 18:
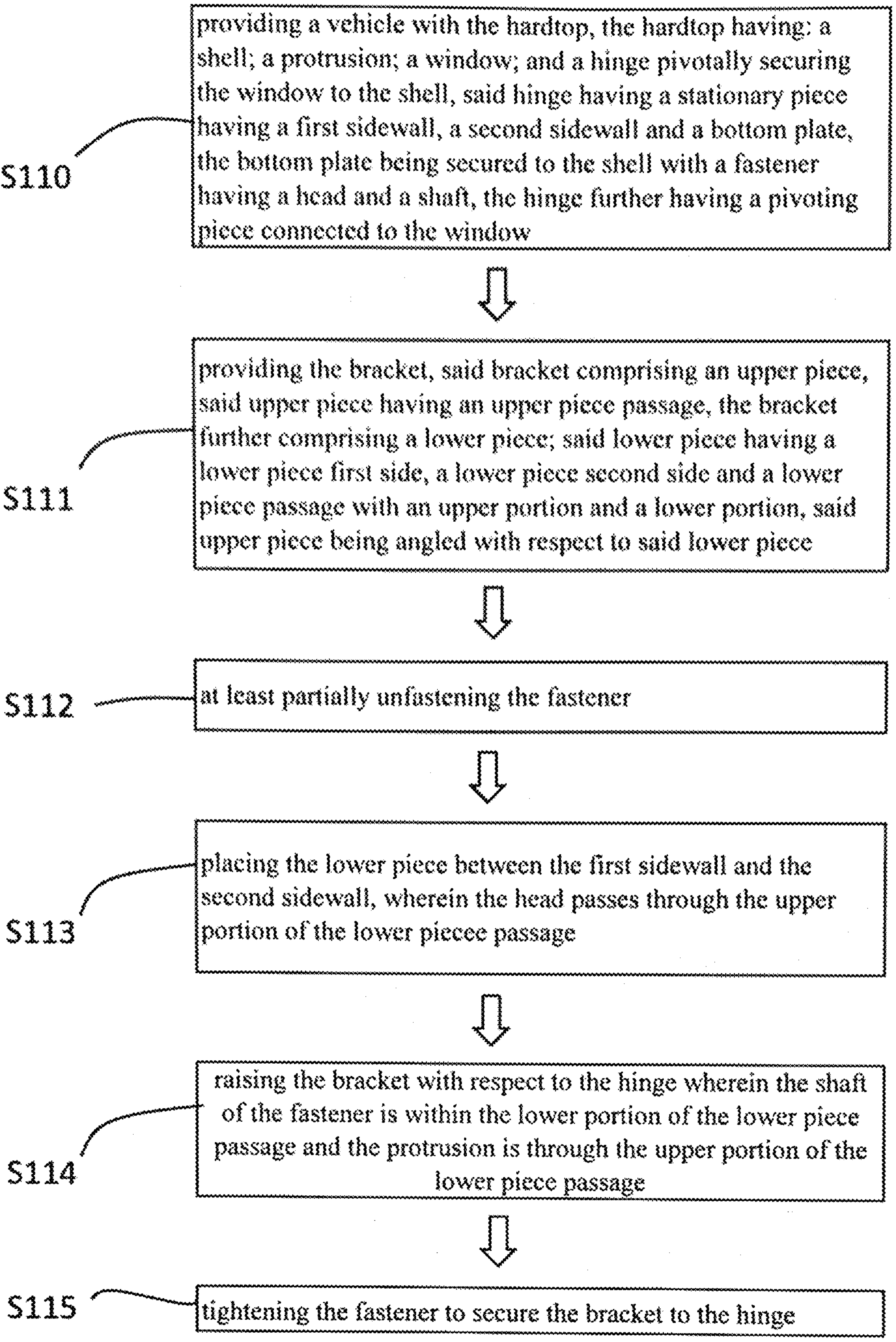
FIG. 18 is a flow chart showing steps of attaching a bracket to a hardtop to facilitate removal of the hardtop.

The bracket 150 can be connected to the hardtop 20, and in particular to the hinge 50 by using the steps shown in FIG. 18. One bracket 150 can be connected to each hinge 50. The brackets are used to facilitate removal of the hardtop 50 by creating lift point for a hook 2 or other connector of a lifting mechanism 1 such as a hoist, harness or other structure to attach to (a front harness will also be used although the front harness will not be connected to the brackets of the present invention).

A method of attaching a bracket to a hardtop to facilitate removal of the hardtop is shown in FIG. 18.

Step 110 involves providing the vehicle 5 having hardtop 50, wherein the hardtop 50 has a shell 30, a protrusion 110, a window 40 and a hinge 50, the hinge 50 pivotally securing the window 40 to the shell 30, the hinge 50 having a stationary piece 80 with a first sidewall 85 a second sidewall 90 and a bottom plate 95, the bottom plate 95 being secured to the shell 30 with a fastener 120 having a head 125 and a shaft 126, the hinge 50 further having a pivoting piece 60 connected to the window 40.

Step 111 involves providing a bracket 150 having an upper piece 170 with an upper piece passage 175, and with a lower piece 180 with a lower piece first side 183, a lower piece second side 184, a lower piece passage 185 with an upper portion 190 and a lower portion 195, wherein the upper piece 170 is angled with respect to the lower piece 180.

Step 112 involves at least partially unfastening the fastener 120.

Step 113 involves placing the lower piece 180 between the first sidewall 85 and the second sidewall 90, wherein the head 125 passes through the upper portion 190 of the lower piece passage 185.

Step 114 involves raising the bracket 150 with respect to the hinge 50 wherein the shaft 126 of the fastener 120 is within the lower portion 195 of the lower piece passage 185 and the protrusion 110 is through the upper portion 190 of the lower piece passage 185.

Step 115 involves tightening the fastener 120 to secure the bracket 150 to the hinge 50.

After step 115 is completed (preferably after method has been done twice for two brackets), a lifting mechanism 1 such as a or rope or other structure with a hook 2 or other attachment structure can be connected to the bracket upper piece passage 175 (via a hook or other structure) of each bracket 150 allowing the rear of the hardtop to be removed from the vehicle (is it preferred that a front harness is also used so that both the front and rear of the hardtop are lifted simultaneously).

Figure 19:
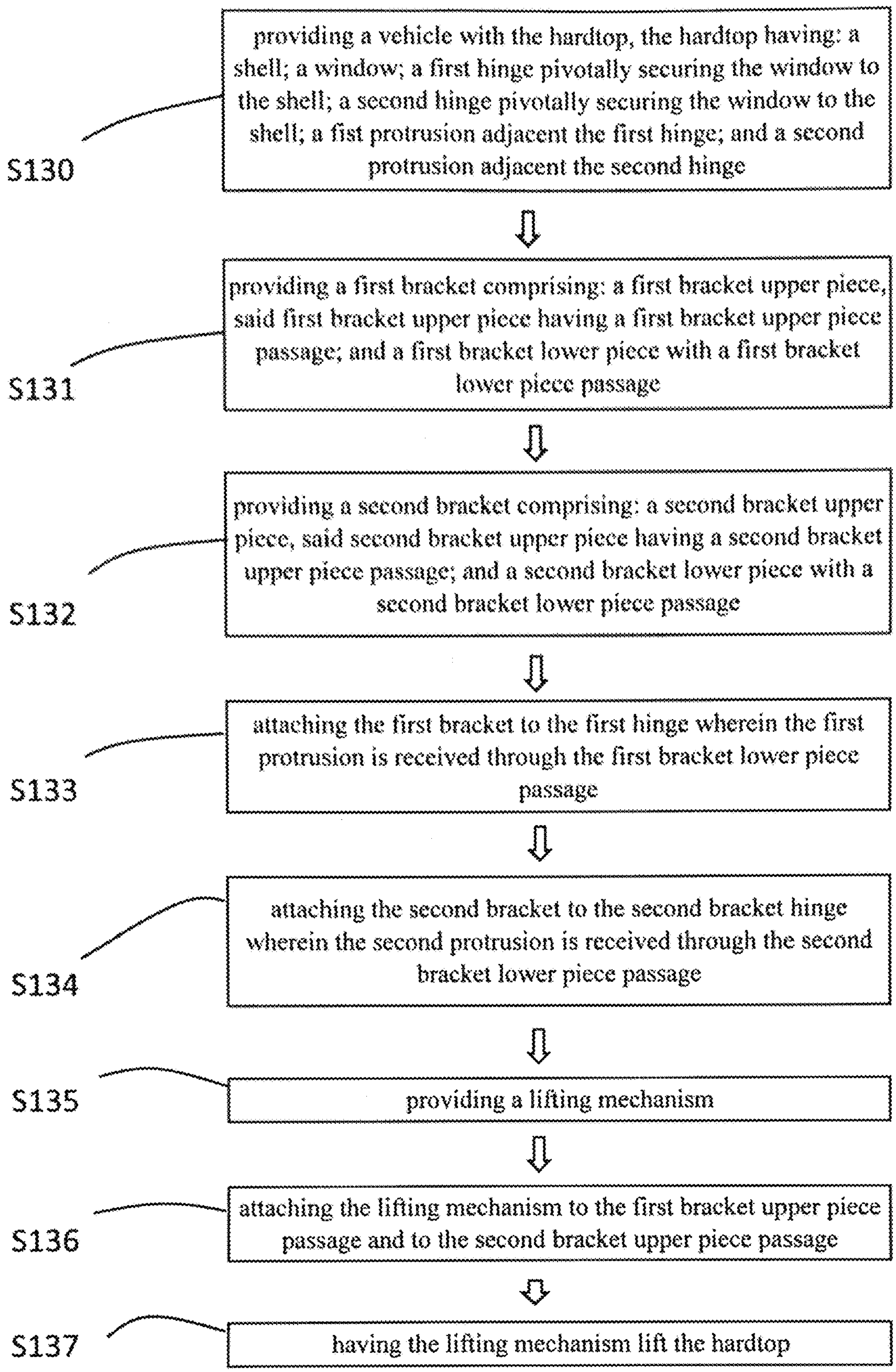
FIG. 19 is a flow chart showing the steps of removing a hardtop using the bracket of the present invention.

The hardtop can be removed by the following steps, as shown in FIG. 19.

Step S130 involves providing a vehicle with the hardtop, the hardtop having: a shell; a window; a first hinge pivotally securing the window to the shell; a second hinge pivotally securing the window to the shell; a first protrusion adjacent the first hinge; and a second protrusion adjacent the second hinge.

Step S131 involves providing a first bracket comprising: a first bracket upper piece, said first bracket upper piece having a first bracket upper piece passage; and a first bracket lower piece with a first bracket lower piece passage.

Step S132 involves providing a second bracket comprising: a second bracket upper piece, said second bracket upper piece having a second bracket upper piece passage; and a second bracket lower piece with a second bracket lower piece passage.

Step S133 involves attaching the first bracket to the first hinge wherein the first protrusion is received through the first bracket lower piece passage.

Step S134 involves attaching the second bracket to the second bracket hinge wherein the second protrusion is received through the second bracket lower piece passage.

Step S135 involves providing a lifting mechanism.

Step S136 involves attaching the lifting mechanism to the first bracket upper piece passage and to the second bracket upper piece passage.

Step S137 involves having the lifting mechanism lift the hardtop.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

One aspect of the present invention is a bracket for use with a hinge of a hardtop, the hardtop having a hinge with a stationary piece and a pivoting piece, the stationary piece having a first sidewall, a second sidewall and a bottom plate, the bottom plate being secured to the hardtop with a fastener having a shaft, the hardtop having a protrusion above the hinge, the bracket comprising:

- an upper piece, said upper piece having an upper piece passage; and
- a lower piece; said lower piece having a lower piece first side, a lower piece second side and a lower piece passage with an upper portion and a lower portion, said upper piece being angled with respect to said lower piece, said lower piece being connected to the hinge by placing the lower piece between the first sidewall and the second sidewall, and tightening the fastener when the shaft is positioned within the lower portion of the lower shaft passage and the protrusion is within the upper portion of the lower piece passage.

Another aspect of the present invention is a combination of:

- a hardtop having:
  - a shell;
  - a protrusion;
  - a window; and
  - a hinge pivotally securing the window to the shell, said hinge having;
    - a stationary piece having a first sidewall, a second sidewall and a bottom plate, the bottom plate being secured to the shell with a fastener having a shaft, said hinge having a hinge width between said first sidewall and said second sidewall and said shaft being equidistant between said first sidewall and said second sidewall; and
    - a pivoting piece; and
- a bracket, said bracket comprising:
  - an upper piece, said upper piece having an upper piece passage; and
  - a lower piece; said lower piece having a lower piece first side, a lower piece second side and a lower piece passage with an upper portion and a lower portion, said upper piece being angled with respect to said lower piece, said lower piece first side and said lower piece second side having a bracket width therebetween, said bracket width being smaller than said hinge width, said lower piece being connected to the hinge by placing the lower piece between the first sidewall and the second sidewall, and tightening the fastener when the shaft is positioned within the lower portion of the lower shaft passage and the protrusion is within the upper portion of the lower piece passage.

It is further appreciated that there are several unique method features according to the present invention. These features can be utilized individually or combined with other features in any possible way, such as being coupled with other features, tripled with other features and/or used all together without departing from the broad aspects of the present invention.

One such method is a method of attaching a bracket to a hardtop to facilitate removal of the hardtop, said method comprising the steps:

- providing a vehicle with the hardtop, the hardtop having:
  - a shell;
  - a protrusion;
  - a window; and
  - a hinge pivotally securing the window to the shell, said hinge having;
    - a stationary piece having a first sidewall, a second sidewall and a bottom plate, the bottom plate being secured to the shell with a fastener having a head and a shaft;
    - a pivoting piece connected to the window;
- providing the bracket, said bracket comprising:
  - an upper piece, said upper piece having an upper piece passage; and
  - a lower piece; said lower piece having a lower piece first side, a lower piece second side and a lower piece passage with an upper portion and a lower portion, said upper piece being angled with respect to said lower piece;
- at least partially unfastening the fastener;
- placing the lower piece between the first sidewall and the second sidewall, wherein the head passes through the upper portion of the lower piece passage;
- raising the bracket with respect to the hinge wherein the shaft of the fastener is within the lower portion of the lower piece passage and the protrusion is through the upper portion of the lower piece passage; and
  - tightening the fastener to secure the bracket to the hinge.

A second method is a method of removing a hardtop of a vehicle, said method comprising the steps:

- providing a vehicle with the hardtop, the hardtop having:
  - a shell;
  - a window;
  - a first hinge pivotally securing the window to the shell;
  - a second hinge pivotally securing the window to the shell;
  - a first protrusion adjacent the first hinge; and
  - a second protrusion adjacent the second hinge;

providing a first bracket comprising:
a first bracket upper piece, said first bracket upper piece having a first bracket upper piece passage; and
a first bracket lower piece with a first bracket lower piece passage;
providing a second bracket comprising:
a second bracket upper piece, said second bracket upper piece having a second bracket upper piece passage; and
a second bracket lower piece with a second bracket lower piece passage;
attaching the first bracket to the first hinge wherein the first protrusion is received through the first bracket lower piece passage;
attaching the second bracket to the second bracket hinge wherein the second protrusion is received through the second bracket lower piece passage;
providing a lifting mechanism;
attaching the lifting mechanism to the first bracket upper piece passage and to the second bracket upper piece passage; and
having the lifting mechanism lift the hardtop.

Thus, it is apparent that there has been provided, in accordance with the invention, a hardtop removal bracket and method of removing an automotive hardtop that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A bracket for use with a hinge of a hardtop, the hinge having a stationary piece and a pivoting piece, the stationary piece having a first sidewall, a second sidewall and a bottom plate, the bottom plate being secured to the hardtop with a fastener having a shaft, the hardtop having a protrusion above the hinge, the bracket comprising:
an upper piece, said upper piece having an upper piece passage; and
a lower piece; said lower piece having a lower piece first side, a lower piece second side and a lower piece passage with an upper portion and a lower portion, said upper piece being angled with respect to said lower piece, said lower piece being connected to the hinge by placing the lower piece between the first sidewall and the second sidewall, and tightening the fastener when the shaft is positioned within the lower portion of the lower piece passage and the protrusion is within the upper portion of the lower piece passage.

2. The bracket of claim 1 wherein said upper piece is angled with respect to said lower piece by 125 degrees, wherein said upper piece passage is offset from a lower piece plane of said lower piece.

3. The bracket of claim 1 wherein said lower portion of said lower piece passage is centrally aligned with said upper portion of said lower piece passage.

4. The bracket of claim 3 wherein said lower portion is a slot open to said upper portion, wherein lifting of the hardtop reinforces a position of the fastener within the lower portion.

5. The bracket of claim 3 wherein:
said upper piece passage has an upper piece passage width;
said upper portion of said lower piece passage has and upper portion width; and
said upper portion width is less than said upper piece passage width.

6. In combination,
a hardtop having:
a shell;
a protrusion;
a window; and
a hinge pivotally securing the window to the shell, said hinge having;
a stationary piece having a first sidewall, a second sidewall and a bottom plate, the bottom plate being secured to the shell with a fastener having a shaft, said hinge having a hinge width between said first sidewall and said second sidewall, and said shaft being equidistant between said first sidewall and said second sidewall; and
a pivoting piece; and
a bracket, said bracket comprising:
an upper piece, said upper piece having an upper piece passage; and
a lower piece; said lower piece having a lower piece first side, a lower piece second side and a lower piece passage with an upper portion and a lower portion, said upper piece being angled with respect to said lower piece, said lower piece first side and said lower piece second side having a bracket width therebetween, said bracket width being smaller than said hinge width, said lower piece being connected to the hinge by placing the lower piece between the first sidewall and the second sidewall, and tightening the fastener when the piece is positioned within the lower portion of the lower shaft passage and the protrusion is within the upper portion of the lower piece passage.

7. The combination of claim 6 wherein:
said hinge is a first hinge and said bracket is a first bracket; and
said hardtop further comprises a second hinge; and
said combination further comprises as second bracket.

8. The combination of claim 7 wherein said second bracket is the same as said first bracket.

9. The combination of claim 6 wherein said upper piece is angled with respect to said lower piece by 125 degrees, wherein said upper piece passage is offset from a lower piece plane of said lower piece.

10. The combination of claim 6 wherein said lower portion of said lower piece passage is centrally aligned with said upper portion of said lower piece passage, and said lower portion is a slot open to said upper portion, wherein lifting of the hardtop reinforces a position of the fastener within the lower portion.

11. A method of attaching a bracket to a hardtop to facilitate removal of the hardtop, said method comprising the steps:
providing a vehicle with the hardtop, the hardtop having:
a shell;
a protrusion;
a window; and
a hinge pivotally securing the window to the shell, said hinge having;
a stationary piece having a first sidewall, a second sidewall and a bottom plate, the bottom plate being secured to the shell with a fastener having a head and a shaft;
a pivoting piece connected to the window;

providing the bracket, said bracket comprising:

an upper piece, said upper piece having an upper piece passage; and a lower piece; said lower piece having a lower piece first side, a lower piece second side and a lower piece passage with an upper portion and a lower portion, said upper piece being angled with respect to said lower piece;

at least partially unfastening the fastener;

placing the lower piece between the first sidewall and the second sidewall, wherein the head passes through the upper portion of the lower piece passage;

raising the bracket with respect to the hinge wherein the shaft of the fastener is within the lower portion of the lower piece passage and the protrusion is through the upper portion of the lower piece passage; and tightening the fastener to secure the bracket to the hinge.

12. The method of claim 11 wherein said upper piece is angled with respect to said lower piece by 125 degrees, wherein said upper piece passage is offset from a lower piece plane of said lower piece.

13. The method of claim 11 wherein said lower portion of said lower piece passage is centrally aligned with said upper portion of said lower piece passage.

14. The method of claim 13 wherein said lower portion is a slot open to said upper portion, wherein lifting of the hardtop reinforces a position of the fastener within the lower portion.

15. The method of claim 13 wherein:

said upper piece passage has an upper piece passage width;

said upper portion of said lower piece passage has and upper portion width; and said upper portion width is less than said upper piece passage width.

16. A method of removing a hardtop of a vehicle, said method comprising the steps:

providing the vehicle with the hardtop, the hardtop having:

a shell;

a window;

a first hinge pivotally securing the window to the shell;

a second hinge pivotally securing the window to the shell;

a first protrusion adjacent the first hinge; and a second protrusion adjacent the second hinge;

providing a first bracket comprising:

a first bracket upper piece, said first bracket upper piece having a first bracket upper piece passage; and a first bracket lower piece with a first bracket lower piece passage;

providing a second bracket comprising:

a second bracket upper piece, said second bracket upper piece having a second bracket upper piece passage; and a second bracket lower piece with a second bracket lower piece passage;

attaching the first bracket to the first hinge wherein the first protrusion is received through the first bracket lower piece passage;

attaching the second bracket to the second bracket hinge wherein the second protrusion is received through the second bracket lower piece passage;

providing a lifting mechanism;

attaching the lifting mechanism to the first bracket upper piece passage and to the second bracket upper piece passage; and having the lifting mechanism lift the hardtop.

17. The method of claim 16 wherein the first bracket upper piece is angularly offset from the first bracket lower piece by 125 degrees.

18. The method of claim 16 wherein the first bracket lower piece passage comprises an upper portion and a lower portion, the lower portion being centrally aligned with the upper portion.

19. The method of claim 18 wherein:

the first protrusion is received within the upper portion;

the first hinge has a fastener with a shaft; and the shaft is received through the lower portion.

20. The method of claim 16 wherein:

the first hinge has a first sidewall and a second sidewall;

the first bracket has a first side and a second side; and the bracket is received between the first sidewall and the second sidewall.

* * * * *